United States Patent [19]

Lampert et al.

[11] Patent Number: 5,328,880
[45] Date of Patent: Jul. 12, 1994

[54] FLUIDITY OF SLURRIES OF KAOLIN CLAY USING TETRAALKYLAMMONIUM COMPOUNDS

[75] Inventors: Jordan K. Lampert, Metuchen; Richard A. Slepetys, Brick; Thomas Dombrowski, Fanwood, all of N.J.

[73] Assignee: Engelhard Corporation, Iselin, N.J.

[21] Appl. No.: 139,297

[22] Filed: Oct. 19, 1993

[51] Int. Cl.$^5$ ................................................ C09K 7/06
[52] U.S. Cl. ..................................... 501/148; 501/146
[58] Field of Search .................. 501/145, 146, 148; 162/181.8; 106/486, 487

[56] References Cited

U.S. PATENT DOCUMENTS

| | | | |
|---|---|---|---|
| 2,950,983 | 8/1960 | Rowland | 106/308 |
| 2,982,665 | 5/1961 | Wilcox | 106/308 |
| 2,994,616 | 8/1961 | Rowland | 106/308 |
| 2,995,458 | 8/1961 | Murray | 106/288 |
| 3,236,666 | 8/1966 | Sawyer | 106/72 |
| 3,266,917 | 2/1966 | Sawyer et al. | 106/72 |
| 3,282,715 | 11/1966 | Sawyer et al. | 106/72 |
| 3,394,022 | 7/1967 | Lyons et al. | 106/288 |
| 3,464,634 | 7/1969 | Brociner | 241/4 |
| 3,663,461 | 5/1972 | Dover | 260/2 BP |
| 3,674,521 | 7/1972 | Noble | 106/72 |
| 3,797,574 | 3/1974 | Feverbacher et al. | 166/274 |
| 3,849,151 | 11/1974 | Abercrombie, Jr. | 106/288 B |
| 3,961,979 | 6/1976 | Abercrombie, Jr. | 106/308 N |
| 4,030,941 | 6/1977 | Kunkle et al. | 106/309 |
| 4,045,235 | 8/1977 | Bidwell et al. | 106/72 |
| 4,105,466 | 8/1978 | Kunkle et al. | 106/309 |
| 4,106,949 | 8/1978 | Malden | 106/288 B |
| 4,144,083 | 3/1979 | Abercrombie, Jr. | 106/288 B |
| 4,144,084 | 3/1979 | Abercrombie, Jr. | 106/288 B |
| 4,144,085 | 3/1979 | Abercrombie, Jr. | 106/288 B |
| 4,314,919 | 2/1983 | Washabaugh et al. | 260/22 CB |
| 4,477,422 | 8/1984 | Ginn | 423/327 |
| 4,572,296 | 2/1986 | Watkins | 166/303 |
| 4,631,091 | 12/1986 | Goodman | 501/148 X |
| 4,738,726 | 4/1988 | Pratt et al. | 106/308 N |
| 4,772,332 | 9/1988 | Nemeh et al. | 106/487 |
| 4,804,416 | 2/1989 | Jepson et al. | 106/468 |
| 4,828,726 | 5/1989 | Himes et al. | 252/8.553 |
| 4,842,073 | 6/1989 | Himes et al. | 166/294 |
| 4,843,048 | 6/1989 | House et al. | 501/148 |
| 4,974,678 | 12/1990 | Himes et al. | 166/308 |
| 5,061,461 | 10/1991 | Sennett et al. | 423/112 |
| 5,089,151 | 2/1992 | Hall et al. | 252/8.557 |
| 5,097,904 | 5/1992 | Himes | 252/8.551 |
| 5,110,501 | 5/1992 | Knudson, Jr. et al. | 252/315.2 |
| 5,128,027 | 7/1992 | Halaka et al. | 229/5 |
| 5,152,906 | 10/1992 | Aften et al. | 252/8.551 |
| 5,160,642 | 11/1992 | Schield et al. | 252/8.551 |
| 5,198,415 | 3/1993 | Stieger | 507/103 |

OTHER PUBLICATIONS

Theng, et al., "The Effect of Exchangeable Alkyl-Ammonium Ions On The Swelling of Montmorillonite In Water", Clay Minerals 7, pp. 271-293 (1968), no month.
Theng, et al., "Adsorption of Alkylammonium Cations By Montmurillonite", Clay Minerals 7, pp. 1-17 (1967) no month.
Weiss, "Organic Derivatives of Mica Type Layer Silicates", Angew. Chem. internat. Edit./vol. 2 (1963) No. 3 pp. 134-144 no month.

Primary Examiner—Karl Group
Assistant Examiner—Chris Gallo
Attorney, Agent, or Firm—Inez L. Moselle

[57] ABSTRACT

The present invention relates to a process for reducing the inherent low shear viscosity of kaolin clays contaminated with expandable layer minerals. A water soluble tetraalkyl ammonium compound is contacted with the clay during conventional wet processing.

17 Claims, No Drawings

FLUIDITY OF SLURRIES OF KAOLIN CLAY USING TETRAALKYLAMMONIUM COMPOUNDS

BACKGROUND

The present invention relates to a novel process for reducing the inherent low shear viscosity of kaolin clays contaminated with expandable layer minerals. A water soluble tetraalkyl ammonium compound is contacted with the clay during conventional wet processing. The invention relates also to novel kaolin products prepared by selectively intercalating contaminating expandable layer mineral impurities in kaolins with a low molecular weight quaternary ammonium cation.

The art of kaolin clay processing entails the controlled mining, blending and wet processing of a variable natural resource into high quality industrial products. Procedures used by the industry in the wet processing are known in the art.

Typically, the kaolin clay crude is crushed and made down into a slurry form (blunged in water) at the mine site with the aid of one or more anionic dispersants. After this blunging step, the pH of the dispersed slurry is usually about 7 to 9. Oversized particles (grit) consisting largely of sand particles are then removed from the blunged clay by known means such as the use of screens and gravity settling. In many processing operations, the degritted slip of kaolin is then separated into one or more particle size fractions by centrifugation or sedimentation. Well known methods are then used to increase the brightness of the fractionated or unfractionated kaolin clays. The brightness improvement methods employed on a clay process stream typically include magnetic separation and reductive bleaching, and may include flotation, and ozonation/oxidative bleaching. A delamination step may be carried out before bleaching. Other than the step of reductive bleaching, which is carried out at an acidic pH, the beneficiation steps are generally conducted with the kaolin slurry in a dispersed state, with the slurry pH neutral to basic. Removal of solubilized impurities along with by-products salts is effected by dewatering the bleached clay, usually by filtration, following by rinsing with clean water.

It is well known that the low shear viscosity of kaolin clay crudes and of the particle size fractions derived from the crudes is one of the principal physical characteristics determining whether or not and, if so, in what proportions the clays and derived fractions will be utilized in the production of high value-added products for the paper industry. See, for example, U.S. Pat. No. 4,105,466 and U.S. Pat. No. 4,030,941, Kunkle, et al.

It has been reported that the low shear rheology of kaolin clay is affected by the surface area of the kaolin particles, with high surface area resulting in high values of low shear viscosity, while high shear viscosity is influenced by particle morphology and particle packing characteristics. See Murray, Haydn, (1984), "Clay" in *Pigments for Paper*, Robert Hagemeyer, editor, TAPPI Press, 95–143. It has long been known that expanding minerals, such as montmorillonite, hectorite, degraded illite and illite/smectite have an adverse effect on the inherent low shear viscosity of kaolin clays. Sodium montmorillonites are particularly troublesome. Generally, these expandable minerals are slimed and can be concentrated in an ultrafine fraction of a kaolin crude (e.g., a fraction 0.2 microns or finer). Accordingly, several suggested techniques for reducing the low shear viscosity of kaolin clay involve physically removing mineral slimes from the kaolin particles. For example, application of high shear followed by centrifugation has been proposed in U.S. Pat. No. 3,464,634, Brociner. Halaka, et al., U.S. Pat. No. 5,128,027, teach a method to remove mineral slimes by overdispersing a kaolin slurry, thereby reflocculating kaolin particles, and then allowing the kaolin flocculates to settle and separate.

U.S. Pat. No. 4,105,466 and U.S. Pat. No. 4,030,941, Kunkle, et al., relate to processes for reducing the clay-water viscosity of crude kaolins having "inherent" high low shear viscosities. The processes feature the incorporation of an aluminum hydroxide polymer with the clay during wet processing and prior to the filtration step. Washing and drying are optional. U.S. Pat. No. 4,045,235, Bidwell, et al. describes similar processing of kaolin with the same type of inorganic polymer for the same purpose. The aluminum hydroxide polymer is identified as being positively charged. Bidwell, et al. note that reaction is "apparently not with the clay mineral itself, e.g., kaolinite . . . but the impurities which are associated with the clay mineral, e.g. montmorillonite".

Numerous patents disclose the addition of reagents to finished clay slurries to reduce viscosity and/or to stabilize viscosity of finished slurries. Patentees do not take steps to improve the inherent viscosity and do not introduce chemicals to control viscosity during wet processing. For example, in Malden, U.S. Pat. No. 4,106,949, a polymeric organic base (polyamine) is added to a dilute clay water slurry to reduce viscosity. Rowland, U.S. Pat. No. 2,994,616 incorporates a water soluble guanidine salt.

It is well known that when cationic materials such as quaternary ammonium salts are added to anionically dispersed kaolin slurries flocculation and thickening occur as a result of charge neutralization. This phenomenon is utilized in the preparation of so-called "bulking" pigments by employing salts of cationic polymers that have a high charge density. See, for example, U.S. Pat. No. 4,738,726, Pratt, et al. and Nemeh, et al., U.S. Pat. No. 4,772,332, both assigned to the assignee of the subject patent application. The cationic polymer is added during wet processing, for example, prior to or after bleaching, and is retained in the filtered washed product. The bulked product has significantly higher viscosity than the original kaolin. It is also known that the same cationic polymers used by Pratt, et al. to flocculate kaolin can deflocculate and thus fluidize kaolin slurries if the cationic is utilized in appropriate concentration and at an acidic pH in the absence of anionic dispersants. See U.S. Pat. No. 5,061,461, Sennett, et al. which utilizes a high charge density cationic polymer in this manner during wet processing of kaolin crudes.

U.S. Pat. No. 3,235,666, Sawyer, et al., assigned to a predecessor of the assignee of the subject patent application, discloses that quaternary ammonium salts of the type having germicidal properties increase the viscosity of kaolin slurries. The salts are not added during wet processing.

It is known that low molecular weight quaternary ammonium compounds form intercalation complexes with expanding lattice minerals but not with kaolin minerals. Theng, et al., Clay Minerals (1967) 7, 1–17; ibid, (1968) 271–293. See also A. Weiss, Angew. Chem. internat. Edit. 2, 134–144 (1963).

SUMMARY OF THE INVENTION

We have invented a novel process for reducing the inherent low shear viscosity of kaolin clays. Kaolins amenable to the processing are crudes or fractions of crudes that contain contaminating expandable layer clay minerals, such as smectite group minerals (for example, montmorillonite, hectorite, nontronite) illite, illite/smectite or combinations of such minerals. In practice of our invention, we add a low molecular weight water soluble tetraalkyl ammonium salt to the impure kaolin during wet processing, resulting in flocculation and thickening of the slurry as a whole. The effect of the added quaternary compound is unexpectedly transitory with respect to the kaolin particles but permanent with respect to the expanding layer impurities. Thus, when the treated clay is washed, unreacted quaternary ammonium compound can be removed from the clay, but not from the impurities. The result is the desired reduction in inherent low shear viscosity. Novel clay products of the invention comprise kaolin clay prepared by intercalating contaminating expandable layer mineral with a quaternary ammonium cation.

While it was logical to expect that introduction of a quaternary ammonium salt would undesirably flocculate and thicken the clay system, it was not predictable that the quaternary ammonium cation could be removed selectively from the kaolin particles.

DESCRIPTION OF PREFERRED EMBODIMENTS

The quaternary ammonium components which are used in accordance with the process of the present invention to improve the inherent low shear viscosity of kaolin clay are characterized by the formula:

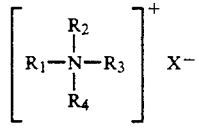

wherein $R_1$, $R_2$, $R_3$ and $R_4$ are each independently alkyl or hydroxyalkyl groups containing from one to eight carbon atoms or alkoxyalkyl groups containing from two to eight carbon atoms. X may be a halide, carbonate, bicarbonate, formate, nitrate, acetate, sulfate or hydroxide.

Specific examples of alkyl groups containing from one to eight carbon atoms include methyl, ethyl, propyl, butyl, pentyl, hexyl, heptyl and octyl. $R_1$, $R_2$, $R_3$ and $R_4$ also may be hydroxyalkyl groups such as hydroxymethyl, hydroxyethyl and the various isomers of hydroxypropyl, hydroxybutyl, hydroxypentyl, etc. Specific examples of alkoxyalkyl groups include methoxymethyl, ethoxymethyl, ethoxyethy, butoxymethyl, butoxybutyl, etc.

Preferably, the quaternary ammonium compound has alkyl chain lengths with less than 8 carbon atoms in any alkyl group. Most preferably there are less than 5 carbon atoms in any alkyl group. The quaternary compound has a molecular weight below 1000, e.g., in the range of about 90 to 700.

Species of especially preferred quaternary ammonium compounds are ammonium halide salts containing no more than four carbons in an alkyl group. Examples are tetramethylammonium chloride, tetramethylammonium bromide, tetraethylammonium bromide, tetraethylammonium chloride and tetrabutylammonium chloride. Of these, the chloride salts are preferred for environmental reasons. In best mode practice, tetramethylammonium chloride is employed.

The quaternary ammonium compounds may be added as aqueous solutions, or dry salts can be incorporated in aqueous kaolin clay slurries. Satisfactory results have been obtained with dilute (e.g., 1% active) solutions and concentrated (e.g., 50% active) solutions.

The pH of the system at the point of quaternary ammonium compound addition is not a critical factor. The compounds are effective when added within the pH range typically encountered in kaolin processing; that is about 2.0 to 9.5, and may be effective when added to slurries with a pH outside of range; that is, when the pH is more acidic (less than 2.0) or more alkaline (higher than 9.5). For example, quaternary ammonium compound treatment was effective when a quaternary ammonium compound was added during the initial blunging of the crude kaolin ore, a process that typically occurs at the mine site or nearby degritting mill. The pH of the dispersed clay slurry formed in the blunging process is typically about 7 to 9.5. The quaternary ammonium compound is preferably added at low pH, for example during the acidification process which takes place in conventional wet processing prior to introduction of a reducing bleach reagent. Bleaching typically takes place at pH of 3 or lower. A solution of quaternary ammonium compound can be added to a filter cake followed by rinsing with water. Especially good results have been achieved when the quaternary ammonium compound was mixed into a kaolin clay slurry that had a pH of about 5.

The method of the invention is effective in reducing the low shear viscosity of crude kaolin ores, of kaolin crudes that have had oversize grit particles largely removed, and of classified particle size fractions of crude kaolin ores; for example, conventional number one fractions (90% by weight finer than 2 microns), number two (80% by weight finer than 2 microns), and on unconventional particle size fractions derived from kaolin clays. Based on testing kaolins with a wide range of low shear viscosities, we find that the method of the invention is usually effective with most kaolin clays having inherently high low shear viscosity at 70% solids, for example clay in which viscosity is greater than 500 cps at 70% solids. For kaolin clays having inherent viscosity appreciatively less than 300 cps at 70%, the response to treatment will vary from deposit to deposit.

Minerals such as smectite, hectorite, (smectite group minerals) mixed layer illite/smectite and degraded illite are expandable because the crystallographic structure of the minerals has a net negative charge imbalance caused by the substitution of a lower valence cation for a higher valence cation. In order for smectite minerals to obtain electrostatic neutrality they adsorb cations such as Na+, Li+, $Ca^{2+}$, and $Mg^{2+}$ in an interlayer space between , crystallographic sheets. Illite maintains neutrality by adsorbing K+ in the interlayer site. Degraded illite has some of the K+ removed and it has adsorbed some of the cations listed above. These cations are called interlayer cations and, except for K+ in illite, they are weakly held by the negatively charged sheets. The adsorbed cations hydrate and cause the sheets to expand. When the cation concentration of a specific element in solution becomes sufficiently high, the cation in solution will displace the interlayer cation. This is referred to as cation exchange. For smectite group minerals, mixed layer illite/smectite and degraded illite this process is easily accomplished. Quaternary ammonium cations formed by the disassociation of quaternary salts will displace interlayer cations when the concentration of the quaternary ammonium cations becomes sufficiently high.

The commonly accepted way to identify minor amounts of clay minerals is by analysis of oriented XRD traces. In this technique a clay sample is oriented on a XRD slide to maximize the (001) reflections (Brown, 1961, Moore and Reynolds, 1989). Due to the nature of X-ray diffraction, amounts of clay minerals present in concentration of less than approximately 2–3% may not be detectable. Minor concentrations of expandable minerals can be identified by chemical techniques whereby excess MgO is assigned to expandable, smectite group minerals. Bundy, et al., 1965, found a negative correlation between MgO and low shear viscosity and attributed this to the presence of smectite group minerals in kaolins.

The following references provide guidelines for identifying expanding layer minerals.

Brown, G., 1961, *The X-ray identification and crystal Structures of clay minerals*, Minerals Society (Clay Minerals Group), London, 554 p.

Moore, D. M., and Reynolds, R. C., 1989, *X-ray diffraction and the identifications and analysis of Clay minerals*, oxford University Press, Oxford, UK, p. 332

Bundy, W. M., Murray, H. H. and Johns, *Physico-chemical properties of kaolinite and relationship to paper coating quality*, TAPPI, vol. 48, pp. 688–696.

There can be a significant concentration of expanding layer, permanent charge site minerals without a large enough domain structure to generate coherent x-ray diffraction. In this case, the permanent charge site minerals can be detected by their final ion exchange capacity at pH<4.

When a quaternary ammonium compound is added to a clay slurry, the degree of clay particle flocculation increases. The effect on the degree of flocculation is strong when the clay in the slurry is already in moderately flocculated condition as a result of low slurry pH; for example, a pH of about 3. At a higher pH, when the clay water slurry is in a deflocculated condition, the addition of a quaternary ammonium compound results in a slight, but visibly detectable, increase in the degree of flocculation. In either case, at high or low pH, low shear viscosity is higher immediately after the addition of the quaternary ammonium compound than it was prior to incorporation of the compound. This effect is transitory and is eliminated by rinsing which is essential to achieve the improvement in inherent low shear viscosity.

Determination of the most effective amount of a quaternary ammonium salt to add is usually dependent upon the particular crude and the equivalent weight of the quaternary compound. An optimum amount can be determined by simple experimental procedures in which the response of a particular crude to varying dosages of quaternary compound is evaluated. The sensitivity to an increase in quaternary compound is usually exhibited over a broad range, e.g., 0.1 to 0.5 weight percent in the case of tetramethyl ammonium chloride.

Using kaolin contaminated with about 2–3% by weight of smectite, satisfactory dosages of quaternary ammonium salt are in the range of 0.01% to 3%, based on the dry weight of the clay. Generally, a dosage of about 0.10 to about 1.0%, most preferably about 0.15% to 0.60% by weight, of a tetraalkylammonium halide is a particularly preferred treatment.

Ambient temperature can be employed in practice of the invention.

In the accompanying examples, slurries were prepared for measurement of Brookfield viscosity, using Engelhard Corporation procedure PL-1. Brookfield viscosity was measured using TAPPI procedure T648 om-88 at 20 rpm, using the #3 spindle, unless otherwise noted. All slurries were formulated with optimum amount of dispersant, following Engelhard Corporation procedure PL-3. Descriptions of these Engelhard procedures appear in U.S. Pat. No. 4,738,726 and are incorporated herein by reference. U.S. Pat. No. 4,045,235, Bidwell, et al. describes a "viscosity concentration" test which is similar to the procedure used to make "fluidity" determinations in the examples.

EXAMPLE 1

A coarse white kaolin clay (Crude "A") with approximately 3% montmorillonite was selected to test the effect of alkylammonium compound treatment on slurry viscosity. The experiments were carried out on a #2 coating fraction of the crude. The alkylammonium treatment was carried out between the acid flocculation and bleaching steps, using a typical processing scheme.

The crude clay was wet sieved through a 325 mesh sieve, and mine dispersant was added at rates of 4 lb/ton sodium silicate ("N" Brand) and 2 lb/ton sodium carbonate. A #2 coating fraction cut was obtained by conventional sedimentation of a 15% solids slurry. The cut was acid flocced to pH=3 with sulfuric acid. The supernatant was decanted after settling overnight, and the slurry was split into seven fractions. Each fraction received a different quaternary alkylammonium chloride treatment, and was aged at ambient temperature for approximately one hour before bleaching at a rate of 6 lb/ton. The bleached slurries were filtered, washed with three times their weight of deionized water, dried and pulverized. Dispersant demands were determined using a 60:40 blend of C211 sodium polyacrylate and soda ash. Fluidity measurements were made on a Bohlin viscometer, with viscosity measured at 3.66 sec$^{-1}$.

The two quaternary alkylammonium chloride salts, tetraethylammonium chloride (TEAC) and tetrabutylammonium chloride (TBAC), used as treatments were chosen because of their strong adsorption behavior on montmorillonite and the published low water sorption capacity of montmorillonite treated with these compounds. The quats were added from aqueous solutions at the levels listed in Table 1.

TABLE 1

Effect of Quaternary Alkyl Ammonium Salt Treatment on a #2 Coating Fraction of Kaolin Clay

| Sample # | Quat | Dosage Level wt % | Fluidity @ 300 cps |
|---|---|---|---|
| 1 | None (control) | — | 62.0% |
| 2 | TEAC | .54% | 67.4% |
| 3 | TEAC | .03% | 61.6% |
| 4 | TBAC | .00009% | 54.1% |
| 5 | TBAC | .092% | 64.8% |
| 6 | TBAC | .018% | 62.5%* |
| 7 | TEAC | 1.02% | 65.8%* |

*Sample 6: filter cake washed first with 1M NaCl solution, then with DI water
*Sample 7: Quaternary salt was added to filter cake after bleaching and filtration and before final rinsing deionized water.

The results in Table 1 show that when 0.54% tetraethylammonium chloride is added, a significant fluidity increase is achieved. This addition rate is equal to the number of equivalents of cation necessary to completely neutralize the permanent charge sites of the montmorillonite in Crude A. The equivalent concentration of montmorillonite was estimated from the exchangeable calcium. Less impressive fluidity improvements are also noted for treatments where tetraethylammonium chloride is added as a rinse during filtration, and for tetrabutylammonium chloride added at a rate of 0.09%. No improvement is observed for addition rates of less than 1/10 the estimated equivalent concentration of montmorillonite in the kaolin.

The original experimental design called for quaternary alkylammonium chloride additions at 1×, 2× and 3× the estimated equivalent concentration of montmorillonite in Crude A. However, the kaolin flocced so severely during the 1X addition of tetraethylammonium chloride, that fluidity improvements could in no way be predicted. To the contrary, the system was so viscous that any beneficial effect was not expected. Consequently, reduced levels were evaluated. However, as it turns out, the 1 X treatment of tetraethylammonium chloride showed the best fluidity enhancement.

In retrospect, it is not surprising that the kaolin flocs with the addition of a cationic. It appears the subsequent filtration and water washing removes the quaternary cation, that is not adsorbed by the smectitic minerals. These observations indicate that the quaternary cations are not preferentially adsorbed over sodium by kaolin and are preferentially adsorbed by the smectitic minerals.

EXAMPLE 2

In this example, the same laboratory procedures described in the previous example were followed to treat another batch of Crude A using various levels of tetraethylammonium bromide. In all tests, solutions of TEAB were added to samples of Crude A after acidification with sulfuric acid to a pH of 3, and prior to the bleach step. Immediately after addition of the quaternary ammonium compound to a slurry, the pH was in the range of 2.74–2.83. All treated slurry samples were strongly flocced. The samples were then bleached with six pounds per ton equivalent (dry/dry basis) of sodium dithionite bleach. Subsequently, the flocced slurries were filtered. Each filter cake was washed with deionized water using about three times the weight of clay in the filter cake. The washed cake was oven-dried overnight at about 50° C.

The bone dried samples were pulverized in a WARING BLENDOR ® mixer. Dispersant demand determinations were made for a 60/40 blend of C211/soda ash in a conventional manner. Results are reported in Table 2.

TABLE 2

| Effect of Quaternary Ammonium Salt Dose on Fluidity of #2 Coating Fraction of Crude A | | | | | |
|---|---|---|---|---|---|
| Sample # | Compound | Dosage wt % | Brookfield Vis. at 70% solids | Fluidity @ 300 cps | Fluidity @ 500 cps |
| 1 | control | — | 1940 cps | 64.62 | 66.17 |
| 2 | TEAB | .375% | 564 cps | 68.35 | 69.73 |
| 3 | TEAB | .65% | 546 cps | 68.40 | 69.80 |
| 4 | TEAB | 1.30% | 1046 cps | 67.03 | 68.48 |

The procedures were repeated using dibutylamine and tributylamine at 0.4% and 0.58% by weight, respectively. The dibutylamine treatment resulted in modest fluidity improvement but caused the slurry to foam. The tributylamine resulted in a significant decrease in slurry fluidity.

Tests were then made to determine the response of treated clays to slurry aging. After the final viscosity determinations reported in Table 2 were made, the four samples were placed in an oven and heated at about 65° C. for about 42 hours. Samples were removed from the oven and let stand for another 27 hours. Viscosity measurements indicated that this heat/aging process, simulating slurry transport in tanker cars, does not affect the viscosities of any of the samples.

EXAMPLE 3

Crude samples from kaolin mines located in Georgia, USA, were collected for testing. The four crude types selected are designated as follows: DFG, a fine gray kaolin; KFW, a fine white kaolin; KCW a coarse white kaolin; and SCW, another coarse white kaolin. KCW and SCW are good quality crudes. KFW and DFG crudes are deficient in low shear viscosity characteristics and can be utilized as minor blend components in conjunction with crudes with very good low shear properties, or in somewhat higher levels in products in which low shear properties are not critical.

Three to five samples of each crude type (DFG 1 through 5; KFW 1 through 4, KCW 1 through 3, SCW 1 through 4) were separately collected from mine face exposures over periods ranging from four days to one month in order to get random samples, indicative of the variability encountered within a designated crude type. Testing methods were substantially similar to those methods described in Example 1, with the following differences. All samples of the four crude types were treated with an amount of tetraethylammonium chloride solution (50% active) equivalent to 0.3% TEAC dosage on a dry quaternary ammonium compound/dry degritted clay basis. Sodium silicate/soda ash dispersed aqueous slurries samples of crude types DFW, KFW, and KCW were degritted and then subjected to fractionation by sedimentation to recover #1 (90% finer than two microns) or #2 (80% finer than two microns) fractions. Then the 50% active solutions were added directly to the kaolin slurry simultaneously with the addition of acid, prior to the bleaching step.

With crude type SCW, at the same time as the crude was being made down to slurry (also using a 60/40 sodium silicate/soda ash dispersant blend), the 50% active quaternary ammonium compound solution was mixed in. When the slurry makedown process was complete, the slurry had a pH of about 8. The treated, whole crude slurry was then degritted by wet sieving, fractionated, and subjected to the conventional processing as described.

All samples derived from each crude type were subsequently acid flocced with the addition of sulfuric acid, then bleached with K-BRITE sodium dithionite bleach, filtered, washed with deionized water, using water in amount equal to two times the weight of the (dry basis) kaolin contained in the filter cake. The cakes were dried at about 40° to 60° C. After drying, the samples were reslurried, using a 60/40 C211/soda ash blend dispersant, and tested for viscosity. Brookfield viscosity measurements were made using conventional techniques. All viscosities reported in Table 3 were determined at 70.0 % slurry solids level:

TABLE 3

Viscosities of Treated and Untreated Kaolin Samples (At 70% solids)

| Clay Desig. | Brookfield Viscosity, cps | |
|---|---|---|
| | Untreated | Quat-treated |
| DFG | | |
| 1 | 1610 | 952 |
| 2 | 1154 | 692 |
| 3 | 1202 | 680 |
| 4 | 1240 | 600 |
| 5 | 1838 | 640 |
| KFW | | |
| 1 | 760 | 520 |
| 2 | 660 | 535 |
| 3 | 760 | 400 |
| 4 | 520 | 275 |
| KCW | | |
| 1 | 200 | 220 |
| 2 | 330 | 330 |
| 3 | 320 | 190 |
| SCW | | |
| 1 | 225 | 195 |
| 2 | 220 | 155 |
| 3 | 210 | 160 |
| 4 | 350 | 300 |

Data in Table 3 show that the fine gray kaolin clay DFG, which has a high low shear viscosity and would be of marginal use as a limited blending component without treatment, is substantially benefitted by treatment with TEAC, and would thereby be of greater utility as a blending component. The fine white crude, KFW, also benefits markedly by the TEAC treatment. All four KFW samples had viscosity improvements, thereby with an average improvement of over 240 cps, from an average of 675 cps to about 432 cps reducing low shear viscosity below a 500 cps product specification control point. The two coarse white samples, KCW and SCW have inherently low low shear viscosity which makes them useful in kaolin processing; yet, TEAC treatment improves the low shear viscosity of these two clays slightly but significantly. All four SCW samples had an improvement in low shear viscosity, averaging about 50 cps, from an average of 251 cps without treatment, to about 200 cps with treatment. Such an improvement could be of commercial importance in particularly demanding end use applications. With the three KCW coarse white samples, only one of the three responded to the quaternary ammonium compound treatment; however the degree of improvement of this one sample, 130 cps, was substantial.

EXAMPLE 4

In a laboratory experiment, tetramethylammonium chloride (TMAC) was added to a semi-processed fraction of kaolin clay. The source of kaolin for this experiment is a fine, white kaolin crude. The crude was dispersed with MAYO 148EX dispersant (which, according to the supplier, is composed of lignin sulfonate, naphthalene sulfonate and polyacrylate salt). The dispersed slurry was then fractionated by centrifuge to remove substantially all particles less than 0.4 microns e.s.d. The recovered coarse fraction was de-watered and spray-dried. Four aliquots of the spray-dried material were re-dispersed at 20% solids with a 60/40 blend C211/soda ash, then acidified to a pH of about 3 with sulfuric acid. Three of the four aliquots were then treated with a 1.0% active aqueous solution of tetramethylammonium chloride, with the dosage level equivalent to 0.1%, 0.3% and 0.5% dry quaternary ammonium compound/dry clay weight basis. Bleaching, filtering and washing described in Example 1 were used. Low shear viscosity and fluidity determinations were made and reported in Table 4.

TABLE 4

Effect of Tetramethylammonium Chloride on on Fluidity of Fine White Kaolin

| Treatment Level | Fluidity at 300 cps | Fluidity at 500 cps |
|---|---|---|
| 0% - control | 68.73% | 70.58% |
| 0.1% | 70.21% | 71.82% |
| 0.3% | 70.61% | 72.14% |
| 0.5% | 70.42% | 72.15% |

Data in Table 4 show that quaternary ammonium compound treatment at a dosage level of 0.3% TMAC resulted in an improvement in fluidity solids of nearly 2% at 300 cps, and about 1.6% at 500 cps, compared to the untreated control sample. An increased TMAC dosage of 0.5% yielded no viscosity improvement over the 0.3% dosage level.

While the present invention improves the inherent low shear viscosity of kaolin crudes and fractions thereof, further improvements can be achieved by treatments of finished clay slurries or additional wet processing steps such as desliming, etc.

All Brookfield viscosity values set forth in the accompanying claims are those measured at 70% solids and 20 rpm.

It is contemplated that particles containing expandable layer mineral(s) with intercalated quaternary ammonium cation can be physically removed from the kaolin slurry by means of flotation using a flotation collector reagent selective to the intercalated mineral. Because intercalation results in displacement of water from the interlayers of the expandable mineral, the intercalcated material will have a greater affinity for the hydrophobic moiety of the collector reagent. Examples of collector reagents are fatty acids, such as oleic acid, resin acid or mixtures.

What is claimed is:

1. A process for treating kaolin clay comprising contacting an aqueous slurry of a kaolin clay with a water soluble quaternary alkyl ammonium compound, washing the kaolin clay, and recovering a washed kaolin clay product having reduced inherent low shear viscosity.

2. The process of claim 1 wherein said slurry is dewatered after said contacting and before the resulting dewatered kaolin is washed.

3. A process for reducing the low shear viscosity of kaolin clay contaminated with at least one impurity having an expandable lattice which comprises contacting an aqueous slurry of said kaolin clay with a tetraalkyl ammonium compound in which the cation has alkyl chain lengths of 8 carbon atoms or less, thereby forming a thickened slurry, dewatering said thickened slurry, washing the resulting dewatered clay and recovering the washed clay.

4. The process of claim 3 wherein said slurry is filtered before being contacted with said quaternary ammonium compound and said quaternary ammonium compound is added to said filter cake prior to washing.

5. The process of claim 3 wherein said impurity is selected from the group consisting of smectite group minerals, mixed layer illite/smectite, degraded illite and mixtures thereof.

6. The process of claim 3 wherein said impurity having an expandable lattice is a smectite.

7. The process of claim 3 wherein the cation of said quaternary ammonium compound has the general formula:

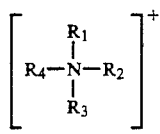

wherein $R_1$, $R_2$, $R_3$ and $R_4$ are each independently alkyl or hydroxy alkyl groups containing from 1 to 8 carbon atoms.

8. The process of claim 3 wherein said quaternary ammonium compound is selected from the group consisting of tetramethylammonium halide salt, tetraethylammonium halide salt and tetrabutylammonium halide salts.

9. The process of claim 3 wherein said quaternary ammonium compound is tetramethylammonium chloride.

10. The process of claim 3 wherein said quaternary ammonium compound is tetraethylammonium chloride.

11. The process of claim 3 wherein the amount of said quaternary ammonium compound is from 0.01 to 3 percent of the weight of the clay, on a dry salt/dry clay basis.

12. The process of claim 11 wherein the amount of said quaternary ammonium compound is from 0.15 to 0.60 percent by weight.

13. The process of claim 3 wherein the viscosity of the kaolin clays prior to the addition of said quaternary ammonium salt is greater than 500 cps.

14. The process of claim 3 wherein said kaolin clay is dewatered by filtration to produce a filter cake.

15. The process of claim 14 wherein said quaternary ammonium compound is added to said filter cake.

16. The process of claim 14 wherein said quaternary ammonium compound is contacted with an aqueous slurry of kaolin clay prior to filtration.

17. Kaolin clay prepared by intercalating contaminating expandable layer mineral with a quaternary ammonium cation.

* * * * *